April 3, 1945. O. A. KOEHLER 2,372,725
PLASTIC BOTTLE CAP
Filed Nov. 9, 1942

INVENTOR.
OTTO A. KOEHLER.
BY Miller & Miller
ATTORNEYS.

Patented Apr. 3, 1945

2,372,725

UNITED STATES PATENT OFFICE 2,372,725

PLASTIC BOTTLE CAP

Otto A. Koehler, San Antonio, Tex.

Application November 9, 1942, Serial No. 465,017

6 Claims. (Cl. 215—45)

This invention relates to a plastic bottle cap and has for an object to provide a bottle cap made of plastic and capable of use on any conventional bottle neck of the type that normally uses the so-called (crown) type of bottle cap.

As is well known, the conventional crown type of bottle cap made of metal has been in use by the millions and there is a great deal of automatic machinery for capping bottles using this crown bottle cap made of metal. However, metal crown bottle caps are becoming scarce and substantially unavailable, and it is a further object of this invention to provide a bottle cap made of plastic which can be placed on bottles by the same automatic machinery that is used for the metal crown bottle cap, and which improved plastic bottle cap will seal the contents of the bottle just as firmly and securely as the metal cap ever did.

A further object of this invention is to provide a plastic crown bottle cap which may be made of any available suitable plastic material and which will serve to seal the bottle neck firmly and securely.

Still a further object of this invention is to provide a plastic crown bottle cap wherein the same sealing wafer may be used as that used in the metal crown bottle cap so that there is no possibility of any chemical reaction between the plastic material of the cap and the contents of the bottle capped thereby, thus making it possible to select a suitable plastic having the proper physical and chemical properties so far as the manufacture and capping operations are concerned, and yet to be sure that there is no possibility of any contamination of the bottle contents through reaction with the plasitc of the cap for it must be realized that there are innumerable types of plastics available as well as many more that may yet be developed and that not all plastics might be adaptable for the purpose if there were a possibility of contact between the plastic and the bottle contents, although of course, it will probably be preferable to use a plastic material that is chemically inert so far as the contents of the bottle are concerned.

With the foregoing and other objects in view, as will hereinafter become apparent, this invention comprises the combinations, constructions, and arrangements of parts, hereinafter set forth, disclosed, and claimed and illustrated in the accompanying drawing, wherein:

Figure 1:
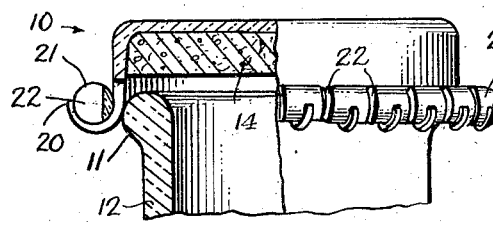
Figure 1 is a partly sectional and partly elevational view of a plastic crown cap of this invention in position ready to be sealed over the lip of a bottle neck.

There is shown at 10 the plastic crown cap of this invention which is adapted to be sealed over the lip 11 of the neck 12 of any conventional bottle of the type that normally receives a metal crown cap. This plastic cap 10 consists of a cup-shaped portion 11 within which is contained the usual sealing wafer 14 made of cork or any other suitable material, it being of the identical or similar composition that is usually found in conventional metal crown caps.

Figures 7, 8:
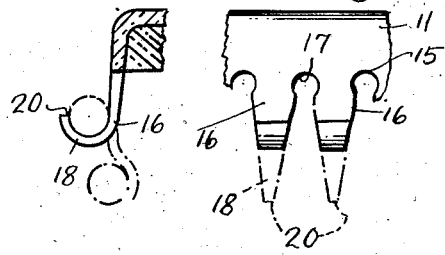
Fig. 7 is a sectional fragmentary view showing the movement of the ring from unsealed to sealing position.
Fig. 8 is a fragmentary elevational view of Fig. 7.

The side 15 of the cup 11 is divided by a plurality of slots into separate fingers 16, each finger 16 being separated from its adjacent finger 16 by a circular-shaped slit 17, thus insuring against the possibility that the slots separating the fingers might tend to extend or creep further than desired into the sides 15 of the cup 11. Each finger 16 is shaped substantially as shown in Fig. 8 when viewed in elevation so that the sides thereof converge toward each other as at 18 and terminate preferably in a square-shaped end 20 so that the slots separating the fingers are substantially larger at the ends of the fingers than they are where the fingers 16 join the cup edges 15.

Secured to the fingers 16 is a ring 21 likewise made of plastic material preferably the same plastic material as that from which the cap 10 itself is made. The ring 21 is provided with a plurality of radial slits 22, there being preferably the same number of slits 22 as there are slots separating the fingers 16. As will be seen from the drawing, particularly Figs. 1 and 2, these slits 22 extend about three-fourths of the way through the ring 21 leaving a continuous section 24 holding the slotted parts of the ring 21 together. This ring 21 is applied about the fingers 16 in the manner shown in Fig. 1 with the slits 22 of ring 21 coinciding in position with the slots dividing the ring 16 thereby.

As thus applied, the continuous portion 24 extends over the fingers 16 closely adjacent but slightly below the cup edge 15 while the ends 20 of each finger 16 is curled about the divided sections 25 of the ring 21. At least one of these fingers 16 and preferably several fingers 16 are integrally secured close to their ends 20 to the outer side of the ring sections 25 of the ring 21. The ends 20 of the fingers 16 may be secured to the ring sections 25 in any suitable manner possibly by a plastic cement substantially identical in composition with the composition of the cap and ring. Likewise it may be convenient, although not necessary, to secure each finger end 20 to its particular ring section 25.

The term plastic as used herein means any suitable material, whether metal or non-metal, capable of being shaped into the desired form and operative for the purpose disclosed.

Figure 2:
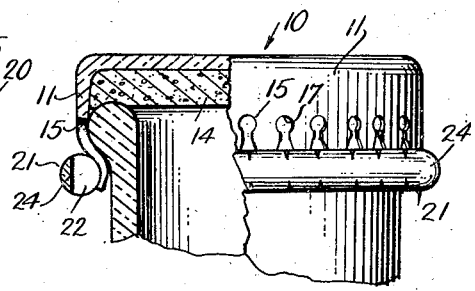
Fig. 2 is a view similar to Fig. 1 in sealed position.
Figure 3:
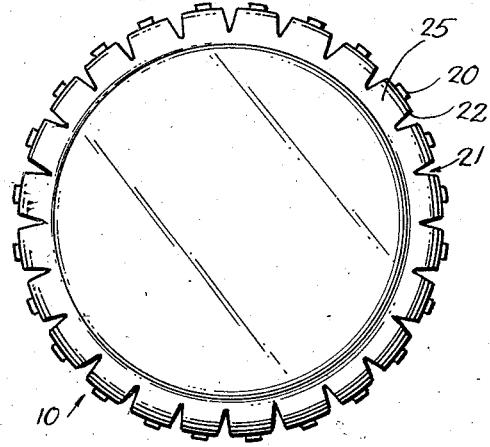
Fig. 3 is a top plan view of Fig. 1.
Figure 4:
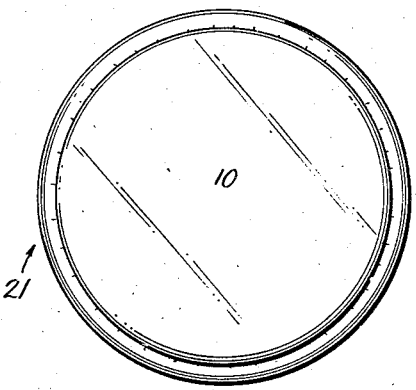
Fig. 4 is a top plan view of Fig. 2.
Figure 5:
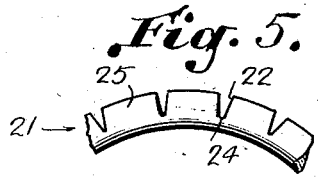
Fig. 5 is a fragmentary view of the sealing ring in non-sealing position.
Figure 6:
Fig. 6 is a fragmentary view of the sealing ring in sealing position.

In operation, the bottle cap 10 as shown in Figs. 1 and 3 is placed over the lip 11 of the bottle neck 12 after the bottle has been filled with its appropriate contents, the cap thus being positioned in the usual automatic capping machinery. In such capping machinery a plunger having a cup-shaped end complementary to the crown cap moves down to force the sides of the crown cap over and around the lip 11 of the bottle neck 12. This same plunger will likewise operate with this plastic cap to move the cap from the position shown in Fig. 1 to that shown in Fig. 2, pressing the cord sealing wafer 14 into sealing position against the edge of the lip 11. Simultaneously the end of the cup of the plunger will push against the top of the ring 21 and move it from the position shown in Fig. 1 to that shown in Fig. 2. During this operation the ring 21 will roll down over the lip 11, the continuous section 24 rotating about its center and causing the ring sections 25 to roll from a position outside of this continuous portion 24 as shown in Fig. 1, to a position inside of this continuous portion 24, as shown in Fig. 2, thus bringing the ring sections 25 under the bottle lip 11 and thereby anchoring and holding the fingers 16 under the bottle lip 11 and pressed against the under part of the bottle lip 11 by the continuous portion 24. The overall inner diameter of the ring 21 in the position in Fig. 1 is greater than the outer diameter of the bottle lip 11, but when moved to the position of Fig. 2, the overall diameter of the ring 21 becomes less than the diameter of the lip 11, thus holding it in position, it being observed that the diameter of the center of the continuous portion 24 of the ring 21 remains substantially unchanged from one position to the other. The ring 21 is therefore stable in either position and holds the fingers 16 in anchoring position below the bottle lip 11. Obviously the cap can be removed by the usual bottle opener which will serve either to pull the ring from the position of Fig. 2 to that of Fig. 1, or if necessary will cut the ring through between two of the radial sections, thus making it easier to roll the ring back to the unsealed position when the bottle is to be capped and the cap is to be thrown away.

While the device has been shown and the structure described in detail, it is obvious that this invention is not to be considered limited to the exact form disclosed, and that changes may be made therein, within the scope of what is claimed without departing from the spirit of the invention.

Having thus disclosed and set forth the invention, what is claimed is:

1. A crown bottle cap comprising a crown cap, a plurality of fingers extending from the edge of said cap and a ring integrally secured over the ends of at least some of said fingers, said fingers being curled partially about said ring when said cap is in unsealed position, said ring being divided into a plurality of sections by slits extending partially through but not completely through said ring, thereby leaving a continuous portion on said ring, said slots extending somewhat beyond the axial center of said ring.

2. A crown bottle cap comprising a crown cap, a plurality of fingers extending from the edge of said cap and a ring secured over the ends of said fingers, said fingers being curled partially about said ring when said cap is in unsealed position, said ring being divided into a plurality of sections by slits extending partially but not completely through said ring thereby leaving a continuous portion on said ring, the diameter of said continuous portion being slightly greater than the diameter of the bottle lip over which the cap is to be applied, said ring being adapted to be rolled over the bottle lip to move the slotted sections and attached cap fingers from a position outside said continuous portion to a position inside said continuous portion, the diameter of said continuous portion remaining substantially unchanged whereby the diameter of the slotted sections is substantially reduced to less than the diameter of the bottle lip.

3. A crown bottle cap, said crown cap having a sealing wafer therein, and means for securing said cap to a bottle neck over the bottle lip comprising a plurality of curled fingers extending downwardly and outwardly from said cap edge, rollable ring means over said fingers adapted to diminish in diameter as it is rolled to press and hold said outwardly curled fingers against the bottle neck, said rollable ring means comprising a ring having a continuous inner periphery and a slotted outer periphery, the slots in said outer periphery being wedge-shaped and extending beyond the annular center of said ring whereby the diameter of the continuous portion remains substantially identical as the slotted portions of the rings are rolled inwardly to make the inner diameter of the ring substantially less.

4. A crown cap having a plurality of depending fingers adapted to be anchored against the sides of a bottle neck to hold the cap thereon, means for moving said depending fingers inwardly to anchoring position comprising a continuous ring secured to at least some of said depending fingers, said ring having a plurality of angular-shaped slots extending from the outer periphery thereof to beyond the annular center thereof whereby said ring may be rolled about the inner continuous portion to bring the outer slotted portions to within the continuous portion thereby reducing the inner diameter of the ring as it is rolled.

5. A crown cap, means extending from the edge of said cap for securing it to a bottle neck over a bottle lip, said means comprising fingers integrally extending downwardly and outwardly from the edge of said cap, a rollable ring of reduceable diameter integrally secured to at least some of and over said fingers, said rollable ring being slotted through its outer periphery to beyond its annular center but leaving a continuous inner portion.

6. A crown cap, means extending from the edge of said cap, for securing it to a bottle neck over a bottle lip, said means comprising fingers integrally extending downwardly and outwardly from the edge of said cap, a rollable ring of reduceable diameter integrally secured to at least some of and over said fingers, said rollable ring being slotted through its outer periphery to beyond its annular center but leaving a continuous inner portion, there being as many slotted portions of said ring as there are fingers on said cap, each finger being curled about its slotted portion when said cap is in unsealed position.

OTTO A. KOEHLER.